(12) United States Patent
Duan et al.

(10) Patent No.: US 10,008,004 B1
(45) Date of Patent: Jun. 26, 2018

(54) ESTABLISHMENT METHOD OF 3D SALIENCY MODEL BASED ON PRIOR KNOWLEDGE AND DEPTH WEIGHT

(71) Applicant: Beijing University of Technology, Beijing (CN)

(72) Inventors: Lijuan Duan, Beijing (CN); Fangfang Liang, Yichang (CN); Yuanhua Qiao, Beijing (CN); Wei Ma, Beijing (CN); Jun Miao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days. days.

(21) Appl. No.: 15/406,504

(22) Filed: Jan. 13, 2017

(30) Foreign Application Priority Data

Dec. 28, 2016 (CN) .......................... 2016 1 1236297

(51) Int. Cl.
| | |
|---|---|
| G06K 9/00 | (2006.01) |
| G06T 7/593 | (2017.01) |
| G06T 17/00 | (2006.01) |
| G06K 9/52 | (2006.01) |
| G06K 9/46 | (2006.01) |
| G06T 15/20 | (2011.01) |
| G06T 7/194 | (2017.01) |

(52) U.S. Cl.
CPC ............ *G06T 7/593* (2017.01); *G06K 9/4604* (2013.01); *G06K 9/4652* (2013.01); *G06K 9/4671* (2013.01); *G06K 9/52* (2013.01); *G06T 7/194* (2017.01); *G06T 15/20* (2013.01); *G06T 17/00* (2013.01); *G06K 2009/4666* (2013.01); *G06T 2200/04* (2013.01)

(58) Field of Classification Search
CPC ........... G06T 7/593; G06T 7/194; G06T 7/11; G06K 9/4604; G06K 9/4652
USPC ......................................... 382/154, 162, 209
See application file for complete search history.

(56) References Cited

U.S. PATENT DOCUMENTS

| | | | | |
|---|---|---|---|---|
| 2015/0169983 A1* | 6/2015 | Kang | ................... | G06K 9/4676 382/154 |
| 2016/0189419 A1* | 6/2016 | Fakih | .................... | G06T 17/005 345/419 |

OTHER PUBLICATIONS

Fang, et al. "Saliency Detection for Stereoscopic Images", pp. 2625-2636, IEEE, Jun. 2014.*

* cited by examiner

*Primary Examiner* — Daniel Mariam
(74) *Attorney, Agent, or Firm* — CBM Patent Consulting, LLC

(57) ABSTRACT

A method of establishing a 3D saliency model based on 3D contrast and depth weight, includes dividing left view of 3D image pair into multiple regions by super-pixel segmentation method, synthesizing a set of features with color and disparity information to describe each region, and using color compactness as weight of disparity in region feature component, calculating feature contrast of a region to surrounding regions; obtaining background prior on depth of disparity map, and improving depth saliency through combining the background prior and the color compactness; taking Gaussian distance between the depth saliency and regions as weight of feature contrast, obtaining initial 3D saliency by adding the weight of the feature contrast; enhancing the initial 3D saliency by 2D saliency and central bias weight.

4 Claims, 4 Drawing Sheets

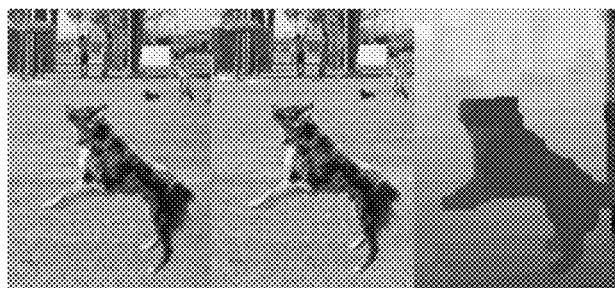 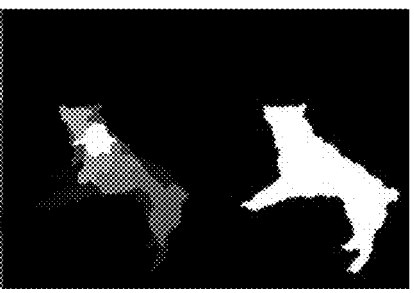
Fig.3a　　Fig.3b　　Fig.3c　　Fig.3d　　Fig.3e
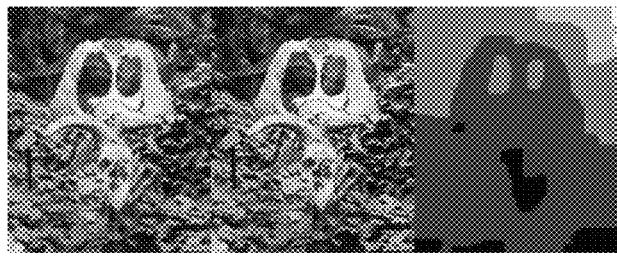 
Fig.4a　　Fig.4b　　Fig.4c　　Fig.4d　　Fig.4e

ESTABLISHMENT METHOD OF 3D SALIENCY MODEL BASED ON PRIOR KNOWLEDGE AND DEPTH WEIGHT This application claims priority to Chinese Patent Application Ser. No. CN2016112362977 filed 28 Dec. 2016.

TECHNICAL FIELD

The present invention relates to a field of visual saliency, in particular to a method of establishing a 3D saliency model based on 3D contrast and depth weight.

BACKGROUND

The selection of important information in a multi-objective scene is an important function of the human visual system. The use of computer to model the above mechanism is research direction of visual saliency, which also provides basis for applications of target segmentation, quality evaluation, etc. In recent years, study of 3D stereoscopic saliency is great significance because of wide application of 3D display technology.

When people watch 3D movies, brain gains depth knowledge and produces three-dimension through binocular disparity translation produced by stereo channel separation technology, which led to change of in human visual observation behavior. Therefore, stereoscopic saliency model different from 2D saliency model design should also consider feature of depth channel (such as contrast of depth, etc.) in addition to common features of color, brightness, texture and orientation in 2D saliency model. At present, acquisition method of depth image contains: obtaining depth image from camera and obtaining disparity map (disparity and depth show inverse relationship) through matching algorithm.

Human beings are influenced by prior knowledge when they are interested in the target of interest, so prior knowledge in both 3D and 2D saliency models can be used to supple saliency model. Common prior knowledge includes two kinds. The first is central bias that is the information of human visual preference for central image. The second is the boundary background prior, where the boundary pixels of image can be used as reference for the saliency model.

In summary, establishment method of 3D saliency model more close to the human eye fixation is necessary.

DESCRIPTION

In view of drawbacks of the prior art, a purpose of the present invention is to provide a method of establishing a 3D saliency model based on 3D contrast and depth weight. Feature is not only from 2D color information, but also is from depth channel information, where prior knowledge of background prior, and color tightness are both considered, which make the 3D saliency model established by the present invention more close to human fixation effect.

For achieving the above purpose, the present invention is realized through the following technical solution:

A method of 3D establishing a saliency model based on 3D contrast and depth weight includes the following steps of:

Step one: extracting 3D feature:

Dividing left view of 3D image pair into N regions by super-pixel segmentation method, labeling as $R_i$, where i takes value 1 to N; defining a region feature f=[l, a, b, d] for region $R_i$, wherein $l=\sum_{i=1}^{N_i} l_i/N_i$, $a=\sum_{i=1}^{N_i} a_i/N_i$, $b=\sum_{i=1}^{N_i} b_i/N_i$, $$d = \sum_{i=1}^{N_i} d_i/N_i,$$

$N_i$ is number of pixels in the region $R_i$, and $l_i,a_i,b_i,d_i$ is value of l, a, b and disparity of pixel in the region $R_i$, respectively;

Step two: calculating feature contrast:

Representing feature contrast between regions by matrix C, then $c_{ij}$ represents norm distance between regional features of the region $R_i$ and region $R_j$, which is calculated as: $c_{ij}=\|u_i f_i - u_j f_j\|_2$, Wherein u is weight of region feature f, u=[1,1,1,q], and variable q represents color compactness of N regions in the left view;

Step three: designing weight of feature contrast:

(1) obtaining depth saliency map $s_s$ by depth domain analysis method on disparity map, then depth saliency $s_d$ of the region $R_i$ is calculated by using a formula as: $s_d(i)=s_s(i) e^{-kt_i}$;

(2) calculating background prior on disparity map;

(3) optimizing depth saliency through the background prior, by using specific process including the step of:

For the region $R_i$, using mean disparity $\bar{d}_i$ of the region $R_i$ on the disparity map to determine whether it appears to have no correlation with background range and the depth saliency $s_d(i)$ is within background range, and the depth saliency is determined by using a formula:

$$s_d(i) = \begin{cases} s_d(i), & \bar{d}_i < \text{thresh} \\ 0, & \bar{d}_i \geq \text{thresh} \end{cases},$$

Wherein threshold thresh is minimum disparity of portion marked as background on the disparity map of depth background $B^d$;

(4) designing weight of feature contrast: weight of feature contrast of the region $R_i$ and the region $R_j$ is represented by a variable $w_{i,j}$. There are:

$$w_{i,j}=\exp(-Dst(i,j)/\sigma^2)\alpha(i)s_d(i),$$

Wherein $\alpha(i)$ is the size of the region $R_i$. $\exp(-Dst(i,j)/\sigma^2)$ represents Gaussian distance between the region $R_i$ and the region $R_j$;

Step four: calculating initial 3D saliency:

Saliency value of the region $R_i$ is $S'(i)=e^{-kt_i}\sum_{i\neq j} w_{i,j} c_{i,j}$, then calculation formula of the initial 3D saliency $S^p(i)$ of the region $R_i$ is $$S^p(i)=\sum_{j=1}^{N_i}\exp(-(\alpha\|clr_i-clr_j\|^2+\beta\|p_i-p_j\|^2))S^r(j),$$

Wherein $\alpha=0.33$, $\beta=0.33$, are two parameters to control the sensitivity color distance ($clr_i - clr_j$) and position distance ($p_i - p_j$), respectively, $N_i$ is the number of pixels in the region $R_i$.

Step five: enhancing initial 3D saliency:

Final 3D saliency $S(i)$ of the region $R_i$ is $S(i)= CBW(i)*S_{pca}^r(i)*S^p(i)$, wherein $S_{pca}^r(i)$ is 2D saliency of the region $R_i$, and $S_{pca}^r(i)=\sum_{p\in r_i} S_{pca}(p)/N_i$, $S_{pca}(p)$ is saliency at pixel level, $$CBW(i) = \begin{cases} 0, & p_i \in B, \\ \exp(-(DstToCt(i))/(2\sigma_{xy}^2) \end{cases},$$

Wherein DstToCt(i) is Euclidean distance for pixel to center coordinate. $B=(B_b \cup B_d)$, $\sigma_{xy}=\sqrt{H*H+W*W}/2$. H and W are width and height of the left view. $B_d$ represents depth background. $B_b$ represents boundary background.

Preferably, in said step two, $q=e^{-kt_i}$, k is Gaussian scale factor. k=4, $t_i$ is calculated as: $t_i = \sum_{j=1}^{N} \|p_j - \mu_i\|^2 dis_{ij}^{clr_i}$. $dis_{ij}^{clr_i}$ is color distance of RGB mean of the region $R_i$ and the region $R_j$, $$dis_{ij}^{clr} = \exp\left(\frac{1}{2\sigma_c^2} \|clr_i - clr_j\|^2\right).$$

$p_j$ is center coordinate of centroid of the region $R_j$. $\mu_i$ is weight position of color $clr_i$, $\mu_i = \sum_{j=1}^{N} dis_{ij}^{clr} p_j$.

Preferably, in said step (2), specific process for calculating background prior on disparity map includes the steps of:

(a) defining initial background image: $B_d=0$;

(b) initializing the furthest background, first, finding coordinate of the largest disparity in disparity map $I_d$, $P_{xy}$=Pos(max($I_d$)); then setting initial value $\emptyset(P_{xy})=1$;

(c) calculating background propagation: $B_d$=Contour($\emptyset(P_{xy})$), wherein symbol Contour represents segmentation based on active contour, pixel of background portion in the depth background. $B_d$ is denoted as 1, and the pixel of foreground portion are represented as 0.

Preferably, in said step (2), specific process for calculating background prior on disparity map includes the steps of:

(a) defining initial background image: $B_d=0$;

(b) initializing the furthest background, first, finding the coordinate of the largest disparity in disparity map $I_d$, $P_{xy}$=Pos(max($I_d$)); then setting initial value $\emptyset(P_{xy})=1$;

(c) calculating background propagation: $B_d$=Contour($\emptyset(P_{xy})$), wherein symbol Contour represents segmentation based on active contour. The pixel of background portion in the depth background image $B_d$ is denoted as 1, and the pixel of foreground portion are represented as 0.

The advantages of the present invention are as follows.

1. In feature extraction aspect of the present invention, region where color contrast and disparity contrast are strong can obtain high saliency value;

2. The invention utilizes color compactness (i.e., color distribution in the 2D image) to calculate feature contrast, thereby increasing saliency value;

3. The present invention not only takes into account the prior of boundary background, but also obtains background prior from the 3D disparity map, utilizing the background prior to optimize the depth saliency so as to remove background interference in the 3D saliency model;

4. In the invention, spatial Gaussian distance between the depth saliency and region are used as weight of the feature contrast, and initial 3D saliency is enhanced by structural dissimilarity in 2D image, thereby enhancing significant area in the depth and reducing saliency value of background part with low correlation value in 3D image.

BRIEF DESCRIPTION OF THE DRAWINGS

FIG. 3a is a left side view of the 3D image pair in one embodiment of the present invention. FIG. 3b is a right side view of the 3D image pair;

FIG. 3b is a right side view of the 3D image pair in one embodiment of the present invention;

FIG. 3c is a disparity map in one embodiment of the present invention;

FIG. 3d is an initial 3D saliency map in one embodiment of the present invention;

FIG. 3e is a target graph (i.e., final 3D saliency map) in one embodiment of the present invention.

FIG. 4a is a left side view of the 3D image pair. FIG. 4b is a right side view of the 3D image pair in another embodiment of the present invention.

FIG. 4b is a right side view of the 3D image pair in another embodiment of the present invention.

FIG. 4c is a disparity map in another embodiment of the present invention.

FIG. 4d is an initial 3D saliency map in another embodiment of the present invention.

FIG. 4e is a target graph (i.e., final 3D saliency map) in another is embodiment of the present invention.

DETAILED DESCRIPTION

Figure 1:
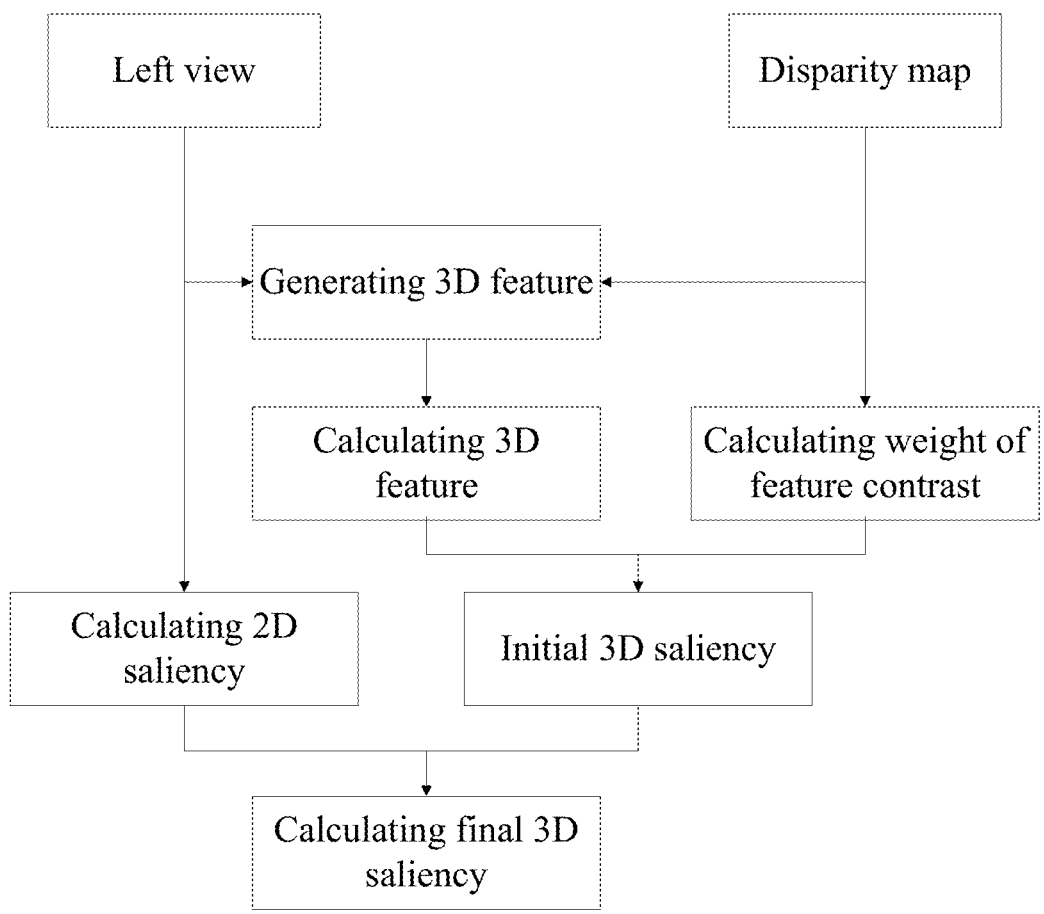
FIG. 1 is a flow diagram of the inventive establishment method of 3D saliency model based on 3D contrast and depth weight.

The present invention will now be described in further detail with reference to the accompanying drawings as required:

As shown in FIG. 1, the present invention provides a method of establishing a 3D saliency model based on 3D contrast and depth weight, including: dividing left view of 3D image pair into multiple regions by super-pixel segmentation method, synthesizing a set of features with color and disparity information to describe each region, and using color compactness as weight of disparity in region feature component, calculating feature contrast of a region to surrounding regions; obtaining background prior on depth of disparity map, and improving depth saliency through combining the background prior and the color compactness; taking Gaussian distance between the depth saliency and regions as weight of feature contrast, obtaining initial 3D saliency by adding the weight of the feature contrast; enhancing the initial 3D saliency by 2D saliency and central bias weight. The 3D saliency model established by the invention has closer to the human gazing effect.

Specifically, the method of establishing a 3D saliency model of the present invention includes the steps of:

Step one: extracting 3D feature:

Dividing left view of 3D image pair into N regions by super-pixel segmentation method (SLIC), labeling as $R_i$, where i takes value 1 to N; defining a region feature using CIELab color and disparity, namely, defining a region feature $f=[l, a, b, d]$ for $R_i$ (features of discriminant $R_i$ are expressed as L*a*b mean and disparity mean of the color image in this region), wherein $l = \sum_{i=1}^{N_i} l_i/N_i$, $a = \sum_{i=1}^{N_i} a_i/N_i$, $b = \sum_{i=1}^{N_i} b_i/N_i$, $$d = \sum_{i=1}^{N_i} d_i/N_i,$$

$N_i$ is the number of pixels in the region $R_i$, and $l_i, a_i, b_i, d_i$ is value of l, a b and disparity of pixel in the region $R_i$, respectively;

Step two: calculating feature contrast:

Representing feature contrast between regions by matrix C, then $c_{ij}$ represents norm distance between regional features of the region $R_i$ and the region $R_j$, which is calculated as:

$$c_{ij} = \|u_i f_i - u_j f_j\|_2,$$

Wherein u is the weight of region feature f, u=[1,1,1,q],

Variable q represents color compactness of N regions in the left view, and is used to indicate distribution of colors of each region in the left view, $q=e^{-kt_i}$, wherein k is Gaussian scale factor. k=4, $t_i$ is calculated as $t_i = \Sigma_{j=1}^{N} \|p_j - \mu_i\|^2 dis_{ij}^{clr_i}$.

Wherein $dis_{ij}^{clr_i}$ is color distance of RGB mean of the region $R_i$ and the region $R_j$, $$dis_{ij}^{clr} = \exp\left(\frac{1}{2\sigma_c^2}\|clr_i - clr_j\|^2\right).$$

$p_j$ is center coordinate of centroid of the region $R_j$, and $\mu_i$ is weight position of color $clr_i$, $\mu_i = \Sigma_{j=1}^{N} dis_{ij}^{clr_i} p_j$.

Step three: designing weight of feature contrast:

After calculating the feature contrast C of each region, the weight of the feature contrast is represented by matrix W. $w_{ij}$ represents corresponding weight of $c_{ij}$.

The weight of the feature contrast takes into account depth saliency, Gaussian distance $\exp(-Dst(i,j)/\sigma^2)$ between region size a(i) and regions. Wherein calculation process of the depth saliency $s_d$ is: obtaining result $s_s$ through domain analysis on the disparity map, and then using background prior (including depth background $B_d$ and boundary background $B_b$) and color tightness (formula $e^{-kt_i}$) to improve. The detailed process is as follows:

(1) calculating depth saliency map

Obtaining the depth saliency map $s_s$ by depth domain analysis method on the disparity map, obtaining $s_d$ through color tightness enhancement, then depth saliency $s_d$ of the region $R_i$ is calculated as: $s_d(i) = s_s(i)e^{-kt_i}$;

(2) calculating background prior on the disparity map:

There are two stages to extract the background prior on the disparity map: background initialization and background propagation. Specific steps include:

(a) defining initial background image: $B_d = 0$;

(b) initializing the furthest background, first, finding coordinate of the largest disparity in disparity map $I_d$, $P_{xy} = Pos(max(I_d))$; then setting initial value $\emptyset(P_{xy}) = 1$;

(c) calculating background propagation: $B_d = Contour(\emptyset(P_{xy}))$, wherein symbol Contour represents segmentation based on active contour, pixel of background portion in the depth background $B_d$ is denoted as 1, and pixel of foreground portion are represented as 0.

(3) optimizing depth saliency through the background prior, specific process includes the step of:

For the region $R_i$, using mean disparity $\bar{d}_i$ of the region $R_i$ on the disparity map to determine whether it appears to have no correlation with background range and the depth saliency $s_d(i)$ is not within background range, the depth saliency is determined by using a formula:

$$s_d(i) = \begin{cases} s_d(i), & \bar{d}_i < thresh \\ 0, & \bar{d}_i \geq thresh \end{cases},$$

Wherein threshold thresh is the minimum disparity of portion marked as background on the disparity map of the depth background $B_d$ namely, $thresh = \min(I_d(q))$, $q \in \{B_d > 0\}$.

The boundary background is $B_b$. Background area in the boundary background is represented by 1, and the other areas are represented by 0. If the $R_i$ region is at the position of the boundary background, the saliency $s_d(i)$ is marked as 0, otherwise it is not changed.

(4) designing weight of feature contrast:

Weight of feature contrast of the region $R_i$ and the region $R_j$ is represented by a variable $w_{i,j}$l. There are:

$$w_{i,j} = \exp(-Dst(i,j)/\sigma^2)\alpha(i)s_d(i),$$

Wherein $\alpha(i)$ is the size of the region $R_i$, $\exp(-Dst(i,j)/\sigma^2)$ represents Gaussian distance between the region $R_i$ and the region $R_j$.

Step four: calculating initial 3D saliency:

After completing calculation of the feature contrast $c_{i,j}$ and the weight $w_{i,j}$ of the region $R_i$, saliency value of the region $R_i$ can be calculated by the following formula:

$$S^r(i) = e^{-kt_i}\Sigma_{i \neq j} w_{i,j} c_{i,j},$$

In order to eliminate effect of super-pixel segmentation errors, saliency (i.e., initial 3D significance) of super-pixel of each region is obtained by saliency linear combination of its surrounding regions. Saliency of super-pixel of the region $R_i$ calculation formula is:

$$S^p(i) = \Sigma_{j=1}^{N_i} \exp(-(\alpha\|clr_i - clr_j\|^2 + \beta\|p_i - p_j\|^2))S^r(j),$$

Wherein $\alpha$ and $\beta$ are respectively parameters of control color distance ($\|clr_i - clr_j\|$) and position distance ($\|p_i - p_j\|$), $\alpha = 0.33$, $\beta = 0.33$, are two parameters to control the sensitivity color distance ($clr_i - clr_j$) and position distance ($p_i - p_j$), respectively, $N_i$ is the number of pixels in the region $R_i$.

Step five: enhancing the initial 3D saliency:

After calculating the initial 3D saliency $S^p(i)$, performing enhancement through 2D saliency and central bias weight. Final 3D saliency of super-pixel of the region $R_i$ is:

$$S(i) = CBW(i) * S_{pca}^{r}(i) * S^p(i),$$

Wherein $S_{pca}^{r}(i)$ is 2D saliency of the region $R_i$, $S_{pca}^{r}(i) = \Sigma_{p \in r_i} S_{pca}(p)/N_i$. $S_{pca}(p)$ is saliency at pixel level. CBW(i) (central bias weight) is a Gaussian function modified with background prior, and is calculated by the following formula:

$$CBW(i) = \begin{cases} 0, & p_i \in B, \\ \exp(-(DstToCt(i))/(2\sigma_{xy}^2)), \end{cases}$$

Wherein DstToCt(i) is Euclidean distance for pixel to center coordinate, $B = (B_b \cup B_d)$, $\sigma_{xy} = \sqrt{H*H + W*W}/2$. H and W are the width and height of the left view. $B_d$ represents depth background. $B_b$ represents boundary background.

Figure 2A:
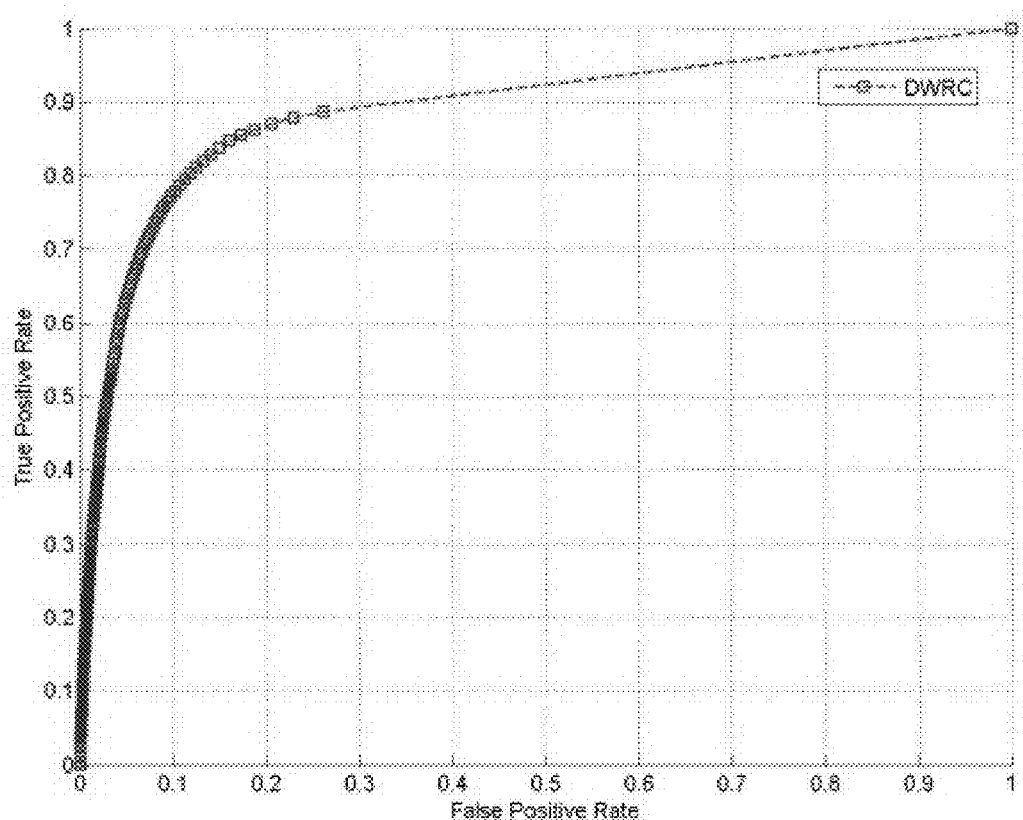
FIG. 2a is a display diagram of ROC (Receiver operating feature) curve performance, wherein abscissa is False Positive Rate (FPR), ordinate is True Positive Rate (TPR).
Figure 2B:
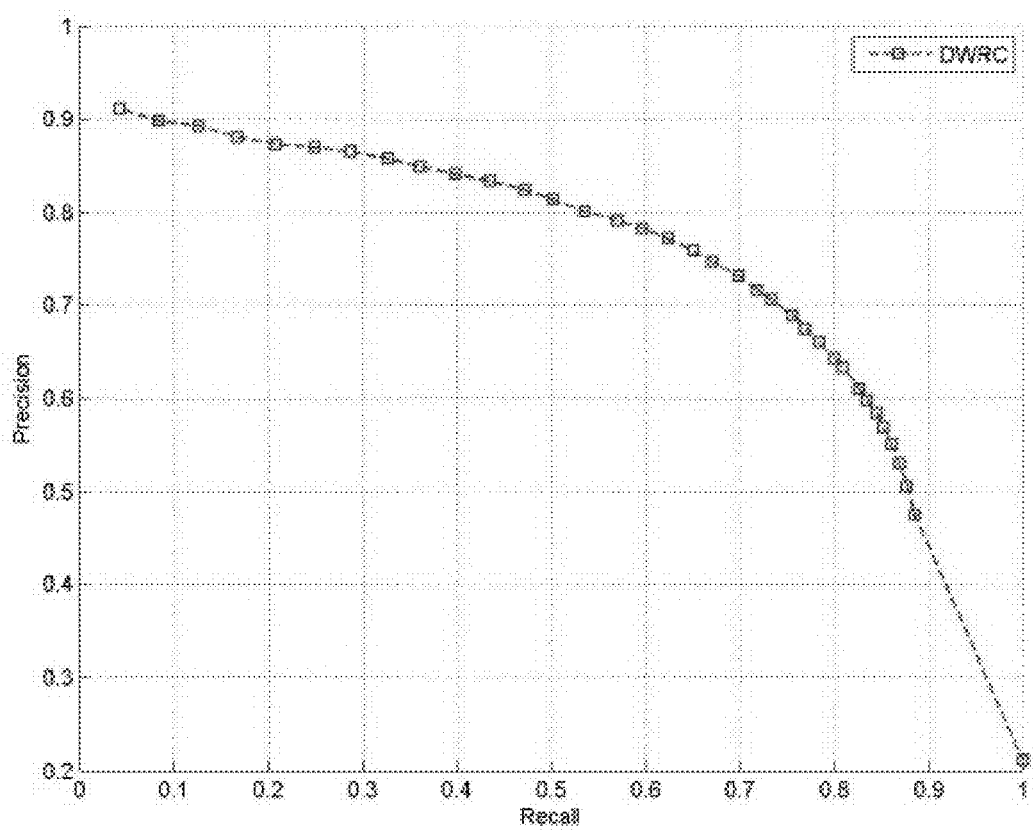
FIG. 2b is PR (Precision-Recall) curve, wherein abscissa is recall rate. Ordinate is predicted precision. Icon DWRC (depth-weighted region contrast) is abbreviation of the present invention method in the FIG. 2a and FIG. 2b.

Referring to FIG. 2a and FIG. 2b, near upper left corner point in curve of the FIG. 2a, AUC (area under roc curve) value is 0.89 calculated according to showing result in FIG. 2a; recall rate increase in FIG. 2b do not cause sharp decrease of accuracy, and $F_{(\beta=0.3)} = 0.61$ calculated as shown in FIG. 2b. That is, the present invention can obtain a 3D saliency model close to the human eye gaze.

Referring to FIG. 3a to FIG. 3e, FIG. 4a to FIG. 4e, in both embodiments, the establishment method of 3D saliency model according to the present invention is used to obtain 3D significance model close to the human eye gaze. Seeing from FIG. 3e and FIG. 4e, regions of color contrast and disparity contrast have high saliency values, and background interference is eliminated, then target's saliency is improved.

In the present inventive method, features are taken from color image and disparity map, and the feature contrast is calculated by using color compactness. In addition to conventional boundary background prior, also using background prior extracted from the disparity map according to the distance from object to observer, and object compactness in color image as supplement of depth saliency, depth saliency of the disparity map is taken as weight of the feature contrast to obtain the initial 3D saliency. Then, performing enhancement for initial 3D saliency through using 2D saliency and the central bias weight. Because feature is not only from the color information of the 2D image, but also contains information of the depth channel, in combination with prior knowledge such as background and color compactness, the 3D saliency model of the present invention has closer to the human gazing effect.

Although the embodiments of the present invention have been disclosed above, they are not limited to the applications previously mentioned in the specification and embodiments, and can be applied in various fields suitable for the present invention. For ordinary skilled person in the field, other various changed model, formula and parameter may be easily achieved without creative work according to instruction of the present invention, changed, modified and replaced embodiments without departing the general concept defined by the claims and their equivalent are still included in the present invention. The present invention is not limited to particular details and illustrations shown and described herein.

What is claimed is:

1. A method of establishing a 3D saliency model based on 3D contrast and depth weight including the following steps of:

step one: extracting 3D feature:
dividing left view of 3D image pair into N regions by super-pixel segmentation method, labeling as $R_i$, where i takes value 1 to N, N is an integer; defining a region feature f=[l, a, b, d] for region $R_i$, wherein $l=\Sigma_{i=1}^{N_i} l_i/N_i$, $a=\Sigma_{i=1}^{N_i} a_i/N_i$, $b=\Sigma_{i=1}^{N_i} b_i/N_i$, $$d = \sum_{i=1}^{N_i} d_i/N_i,$$

$N_i$ is number of pixels in the region $R_i$, and $l_i,a_i,b_i,d_i$ is value of l, a, b and disparity of pixel in the region $R_i$, respectively;

step two: calculating feature contrast:
representing feature contrast between regions by matrix C, then $c_{ij}$ represents norm distance between regional features of the region $R_i$ and region $R_j$, which is calculated as: $c_{ij}=\|u_if_i-u_jf_j\|_2$, wherein u is weight of region feature f, u=[1,1,1,q], and variable q represents color compactness of N regions in the left view;

step three: designing weight of the feature contrast:
(1) obtaining depth saliency map $s_s$ by depth domain analysis method on disparity map, then depth saliency $s_d$ of the region $R_i$ is calculated by using a formula as: $s_d(i)=s_s(i)e^{-kt_i}$;
(2) calculating background prior on the disparity map;
(3) optimizing depth saliency through the background prior, by using specific process including the step of:

for the region $R_i$, using mean disparity $\bar{d}_i$ of the region $R_i$ on the disparity map to determine whether it appears to have no correlation with background range and the depth saliency $s_d(i)$ is within background range, and the depth saliency is determined by using a formula:

$$s_d(i) = \begin{cases} s_d(i), & \bar{d}_i < \text{thresh} \\ 0, & \bar{d}_i \geq \text{thresh} \end{cases},$$

wherein threshold thresh is minimum disparity of portion marked as background on the disparity map of depth background $B_d$;

(4) designing the weight of feature contrast: the weight of feature contrast of the region $R_i$ and the region $R_j$ represented by a variable $w_{i,j}$, and there are:

$w_{i,j}=\exp(-Dst(i,j)/\sigma^2)\alpha(i)s_d(i)$, wherein $\alpha(i)$ is size of the region $R_i$, $\exp(-Dst(i,j)/\sigma^2)$ represents Gaussian distance between the region $R_i$ and the region $R_j$;

step four: calculating initial 3D saliency:
saliency value of the region $R_i$ is $S^r(i)=e^{-kt_i}\Sigma_{i\neq j}w_{i,j}c_{i,j}$, then calculation formula of the initial 3D saliency $S^p(i)$ of the region $R_i$ is $S^p(i)=\Sigma_{j=1}^{N_i}\exp(-(\alpha\|clr_i-clr_j\|^2+\beta\|p_i-p_j\|^2))S^r(j)$, wherein $\alpha=0.33$, $\beta=0.33$, are two parameters to control the sensitivity color distance ($clr_i-clr_j$) and position distance ($p_i-p_j$), respectively, $N_i$ is the number of pixels in the region $R_i$;

step five: enhancing initial 3D saliency:
final 3D saliency S(i) of the region $R_i$ is $S(i)=CBW(i)*S_{pca}^r(i)*S^p(i)$, wherein $S_{pca}^r(i)$ is 2D saliency of the region $R_i$, $S_{pca}^r(i)=\Sigma_{p\in r}S_{pca}(p)/N_i$, $S_{pca}(p)$ is saliency at pixel level, $$CBW(i) = \begin{cases} 0, & p_i \in B, \\ \exp(-(DstToCt(i))/(2\sigma_{xy}^2)) \end{cases},$$

wherein DstToCt(i) is Euclidean distance for pixel to center coordinate, $B=(B_b\cup B_d)$, $\sigma_{xy}=\sqrt{H*H+W*W}/2$, H and W are width and height of the left view, $B_d$ represents depth background, and $B_b$ represents boundary background.

2. The method according to claim 1, being characterized in that: in said step two, $q=e^{-kt_i}$, k is Gaussian scale factor, k=4, $t_i$ is calculated as: $t_i=\Sigma_{j=1}^N\|p_j-\mu_i\|^2 dis_{ij}^{clr_i}$ is color distance of RGB mean of the region $R_i$ and the region $R_j$, $$dis_{ij}^{clr} = \exp\left(\frac{1}{2\sigma_c^2}\|clr_i - clr_j\|^2\right)$$

$p_j$ is center coordinate of centroid of the region $R_j$, and $\mu_i$ is weight position of color $clr_i$, $\mu_i=\Sigma_{j=1}^N dis_{ij}^{clr}p_j$.

3. The method according to claim 2, being characterized in that: in said step (2), specific process for calculating background prior on disparity map includes the steps of:

(a) defining initial background image: $B_d=0$;
(b) initializing the furthest background, first, finding the coordinate of the largest disparity in disparity map $I_d$, $P_{xy}=Pos(max(I_d))$; then setting initial value $\emptyset(P_{xy})=1$;
(c) calculating background propagation: $B_d=Contour(\emptyset(P_{xy}))$, wherein symbol Contour represents segmentation based on active contour, the pixel of background portion in the depth background image $B_d$ is denoted as 1, and the pixel of foreground portion are represented as 0.

4. The method according to claim 1, being characterized in that: in said step (2), specific process for calculating background prior on disparity map includes the steps of:
(a) defining initial background image: $B_d=0$;
(b) initializing the furthest background, first, finding coordinate of the largest disparity in disparity map $I_d$, $P_{xy}=Pos(max(I_d))$; then setting initial value $\emptyset(P_{xy})=1$;
(c) calculating background propagation: $B_d=Contour(\emptyset(P_{xy}))$, wherein symbol Contour represents segmentation based on active contour, pixel of background portion in the depth background $B_d$ is denoted as 1, and pixel of foreground portion are represented as 0.

* * * * *